United States Patent
Tanuma

(10) Patent No.: US 9,283,938 B2
(45) Date of Patent: Mar. 15, 2016

(54) VEHICLE BRAKE HYDRAULIC CONTROL APPARATUS

(71) Applicant: NISSIN KOGYO CO., LTD., Nagano (JP)

(72) Inventor: Katsunori Tanuma, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 728 days.

(21) Appl. No.: 13/645,992

(22) Filed: Oct. 5, 2012

(65) Prior Publication Data

US 2013/0089438 A1 Apr. 11, 2013

(30) Foreign Application Priority Data

Oct. 7, 2011 (JP) .................. 2011-222758

(51) Int. Cl.
*F04B 49/00* (2006.01)
*B60T 8/40* (2006.01)
*B60T 8/48* (2006.01)
*B60T 8/88* (2006.01)

(52) U.S. Cl.
CPC ............. *B60T 8/4045* (2013.01); *B60T 8/4036* (2013.01); *B60T 8/4872* (2013.01); *B60T 8/885* (2013.01)

(58) Field of Classification Search
CPC ... B60T 8/4045; B60T 8/4872; B60T 8/4036; B60T 8/885
USPC ..................................... 417/46; 303/142, 151
See application file for complete search history.

(56) References Cited

U.S. PATENT DOCUMENTS

| | | | |
|---|---|---|---|
| 5,743,598 A * | 4/1998 | Toda et al. .................... 303/11 |
| 5,779,328 A * | 7/1998 | Mergenthaler et al. .. 303/122.12 |
| 6,555,981 B1 * | 4/2003 | Sun ............................... 318/459 |
| 2001/0034574 A1 * | 10/2001 | Tanaka et al. ................... 701/70 |
| 2005/0067893 A1 * | 3/2005 | Kokubo ....................... 303/115.4 |
| 2009/0001807 A1 * | 1/2009 | Nomura et al. ................ 303/20 |

FOREIGN PATENT DOCUMENTS

| | | | |
|---|---|---|---|
| JP | 10035456 | 2/1998 | |
| JP | 10035456 A * | 2/1998 | ............... B60T 8/48 |

* cited by examiner

*Primary Examiner* — Peter J Bertheaud
*Assistant Examiner* — Dominick L Plakkoottam
(74) *Attorney, Agent, or Firm* — Andrew M. Calderon; Roberts Mlotkowski Safran & Cole, P.C.

(57) ABSTRACT

A vehicle brake hydraulic control apparatus according to one embodiment includes: a suction valve; a pump; a motor for driving the pump; and a control unit controlling the suction valve and the motor through connection/disconnection of power thereto. The control unit includes: a detection module configured to detect a back electromotive voltage generated due to an inertia rotation of the motor after disconnection of power; a voltage check module configured to check whether a voltage condition is satisfied or not that the back electromotive voltage is equal to or less than a given voltage; and a time check module configured to check whether a time condition is satisfied or not that a given time has passed after the voltage condition has been satisfied. And, the control unit closes the suction valve when the time condition is satisfied.

17 Claims, 9 Drawing Sheets

VEHICLE BRAKE HYDRAULIC CONTROL APPARATUS

CROSS-REFERENCE TO RELATED APPLICATION(S)

This application claims priority (priorities) from Japanese Patent Application No. 2011-222758 filed on Oct. 7, 2012, the entire contents of which are incorporated herein by reference.

FIELD

The present invention relates to a vehicle brake hydraulic control apparatus and, specifically, it relates to a vehicle brake hydraulic control apparatus including a pump for drawing up brake fluid through a suction valve from a hydraulic source and a motor for driving the pump.

BACKGROUND

In a vehicle brake hydraulic control apparatus, in an operation to stop a pump, if a suction valve is closed simultaneously with the stop of a motor, due to the inertial rotation of the motor, brake fluid may be drawn up by the pump to generate negative pressure between the suction valve and the pump, and cavitation may be caused. For example, JP-H10-035456-A discloses a technology to solve this problem.

In JP-H10-035456-A, when stopping the pump, after power to the motor is disconnected, the suction valve is closed after the passage of a given time, such that the inertia rotation of the motor ends during such given time, thereby preventing generation of negative pressure.

In JP-H10-035456-A, the given time is set for the time that is necessary from the disconnection of power to the motor to the stop of the inertia rotation of the motor according to the characteristic of the motor. However, this given time is set by taking into account worst cases of the structural variations of the motor, the pump or the like, the rotation number of the motor, a load applied to the motor, temperature, supply voltages and the like, that is, a case where the motor is most difficult to stop. Thus, the given time tends to be set for the time fairly longer than the actual time necessary for the motor to stop, and the suction valve is left open during this time. As a result, the time of power connection to the suction valve increases, thereby increasing the heat generation amounts of the coil and the ECU of the suction valve.

SUMMARY

According to the present invention, there is provided a vehicle brake hydraulic control apparatus, including: a suction valve configured to open upon connection of power thereto; a pump configured to draw up brake fluid from a hydraulic source through the suction valve; a motor configured to drive the pump upon connection of power thereto; and a control unit configured to control the opening/closing of the suction valve and the drive of the motor through connection/disconnection of power thereto, such that the suction valve is closed after power to the motor is disconnected, wherein the control unit includes: a detection module configured to detect a back electromotive voltage generated due to an inertia rotation of the motor after disconnection of power to the motor; a voltage check module configured to check whether a voltage condition is satisfied or not that the back electromotive voltage is equal to or less than a given voltage; and a time check module configured to check whether a time condition is satisfied or not that a given time has passed after the voltage condition has been satisfied, whereby the control unit closes the suction valve when the time condition is satisfied.

In this structure, since a back electromotive voltage can be detected by the detection module, during the time until the voltage condition is satisfied, the actual motor rotation can be grasped, and thus, this time need not be set for the time (longer than actual time) set with various factors taken into account as in the conventional technology. Also, since, for the given time in the time condition to be confirmed next, the time necessary for satisfaction of the voltage condition may not be considered, this given time can be shortened accordingly. Therefore, the time for connecting power to the suction valve can be reduced greatly, thereby reducing the heat generation of the suction valve and the control unit.

The given voltage may be set for a value equal to or larger than a possible maximum offset value of a zero point position of the back electromotive voltage.

Thus, even when the zero point position of the back electromotive voltage detected by the detection module is offset, the back electromotive voltage detected can surely reach the given voltage and, after then, after the passage of the given time, the suction valve can be closed surely.

The given time may be set for a time necessary for the motor to stop the inertia rotation while generating the back electromotive voltage corresponding to a difference between the given voltage and a possible minimum offset value of the zero point position of the back electromotive voltage.

Thus, even when the zero point position is offset to the minimum value, the suction valve can be closed surely after the motor stops.

The given voltage may be set for the possible maximum offset value.

Thus, as compared with a case where a given voltage is set for a value larger than the possible maximum offset value, a given time in the time condition can be reduced.

According to the present invention, since the time necessary for connecting power to the suction valve when stopping the pump motor can be shortened, the heat generation of the suction valve and the like can be reduced.

DETAILED DESCRIPTION

Figure 1:
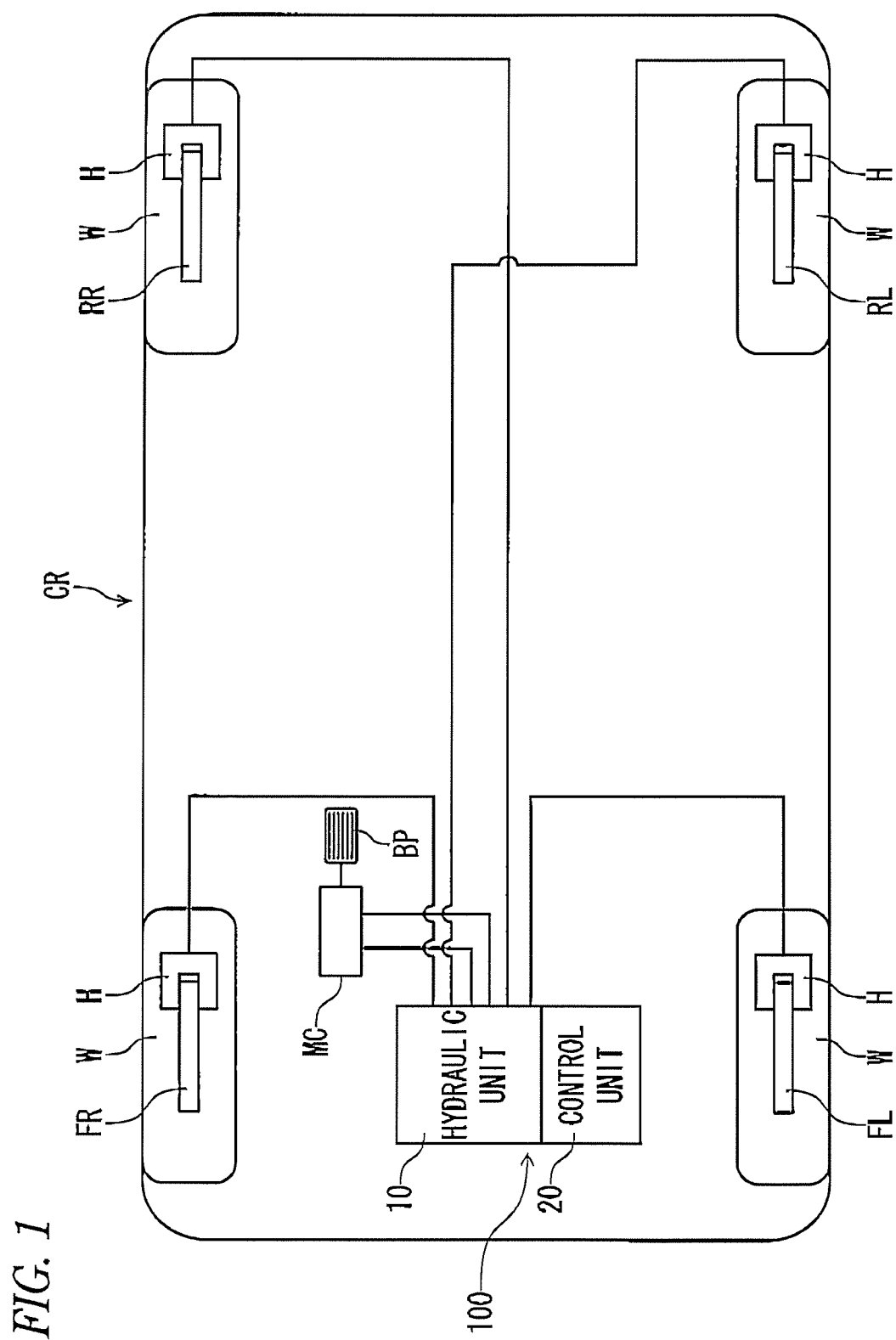
FIG. 1 illustrates a vehicle including a vehicle brake hydraulic control apparatus according to an embodiment.

An embodiment will be described while referring to the drawings.

As shown in FIG. 1, a vehicle brake hydraulic control apparatus 100 includes a hydraulic unit 10 and a control unit 20, and controls a brake force (brake hydraulic pressure) to be applied to the respective wheels W of a vehicle CR. The hydraulic unit 10 has oil passages (hydraulic passages) and various parts, and the control unit 20 controls the various parts provided within the hydraulic unit 10.

The control unit 20 includes, for example, a CPU, a RAM, a ROM and an input/output circuit, and controls the various parts according to inputs from a wheel speed sensor and the like as well as programs and data stored in ROM.

Wheel cylinders H are hydraulic devices. The wheel cylinders H convert brake pressure which is generated by a master cylinder MC and transmitted through the vehicle brake hydraulic control apparatus 100 to the operation power of wheel brakes FR, FL, RR and RL provided on the respective wheels W. The wheel cylinders H are connected to the hydraulic unit 10 through respective pipes.

Figure 2:
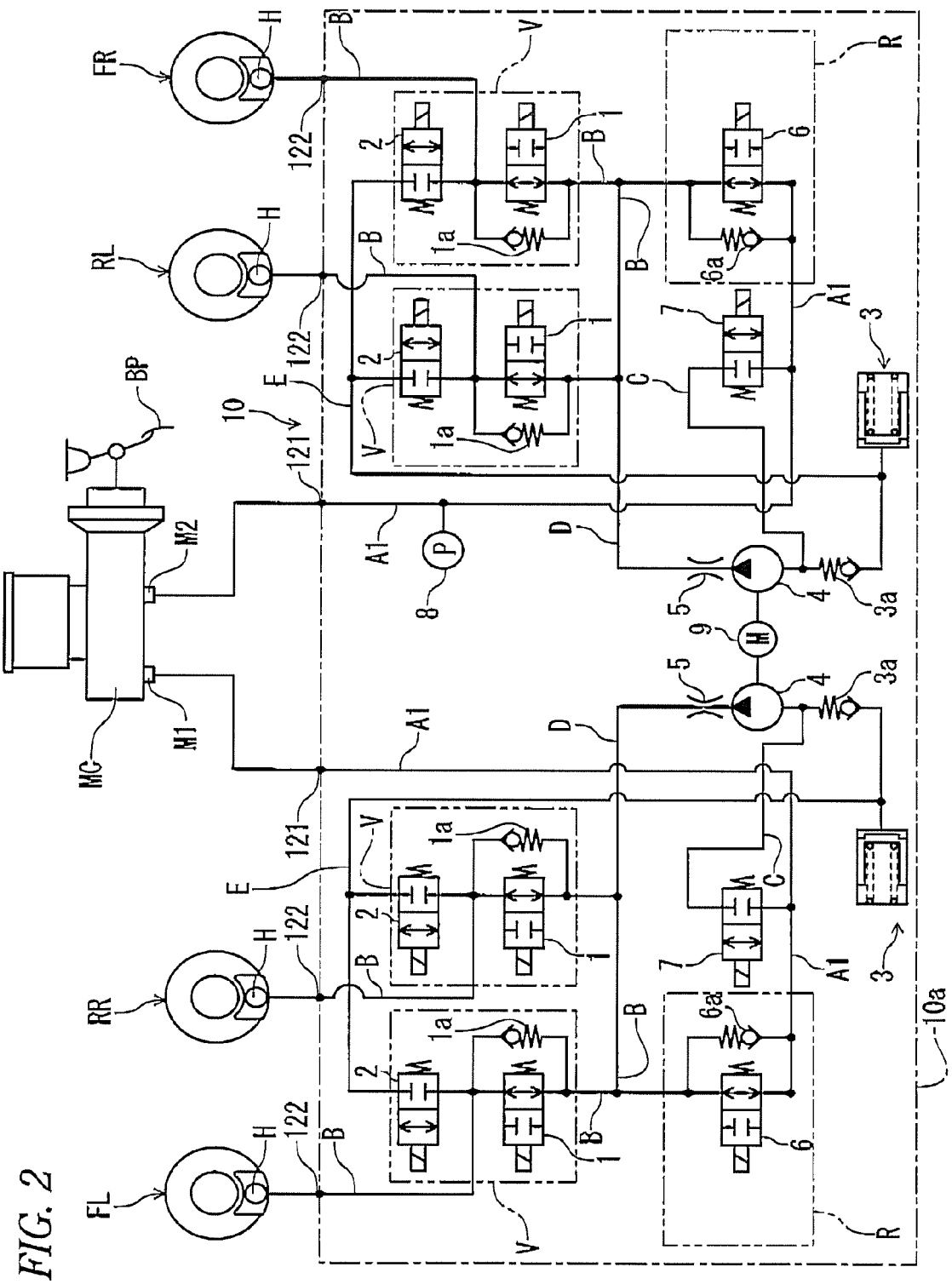
FIG. 2 illustrates a hydraulic circuit of the brake hydraulic control apparatus.

As shown in FIG. 2, the hydraulic unit 10 is interposed between the wheel brakes FR, FL, RR, RL and the master cylinder MC which serves as a hydraulic source for generating brake pressure in accordance with a depressing power applied to a brake pedal BP by a driver. The hydraulic unit 10 includes a pump body 10*a* serving as a base member having oil passages through which the brake fluid flows, and multiple inlet valves 1 and outlet valves 2 respectively provided on the oil passages.

The two output ports M1 and M2 of the master cylinder MC are respectively connected to the inlet ports 121 of the pump body 10*a*, and the outlet ports 122 of the pump body 10*a* are connected to the respective wheel brakes FR, FL, RR and RL. Since the oil passages within the pump body 10*a* are communicating with each other from the inlet ports 121 to the outlet ports 122, the depressing power applied to the brake pedal BP can be transmitted normally to the respective wheel brakes FR, FL, RR and RL.

An oil passage starting at the output port M1 communicates with the left front wheel brake FL and the right rear wheel brake RR, while an oil passage starting at the output port M2 communicates with the right front wheel brake FR and the left rear wheel brake RL. Hereinafter, the oil passage starting at the output port M1 is called "a first system", whereas the oil passage starting at the output port M2 is called "a second system".

The hydraulic unit 10 includes, in the first system, two control valve units V corresponding to the respective wheel brakes FL and RR, and similarly, in the second system, two control valve units V corresponding to the respective wheel brakes RL and FR. Also, the hydraulic unit 10 includes, in the respective first and second systems, reservoirs 3, pumps 4, orifices 5, regulator valve units (regulators) R, and suction valves 7. The hydraulic unit 10 further includes a motor 9 for driving the first system pump 4 and the second system pump 4 in common. The rotation number of the motor 9 is controllable. In this embodiment, a pressure sensor 8 is provided only in the second system.

Hereinafter, oil passages extending from the output ports M1 and M2 of the master cylinder MC to the regulator valve units R are called "output hydraulic passages A1". An oil passage extending from the regulator valve unit R of the first system to the wheel brakes FL and RR, and an oil passage extending from the regulator valve unit R of the second system to the wheel brakes RL and FR are called "wheel hydraulic passages B". Oil passages extending from the output hydraulic passages A1 to the pumps 4 are called "suction hydraulic passages C". Oil passages extending from the pumps 4 to the wheel hydraulic passages B are called "discharge hydraulic passages D". And, oil passages extending from the wheel hydraulic passages B to the suction hydraulic passages C are called "open passages E".

The control valve unit V controls the application of the hydraulic pressure from the master cylinder MC or the pump 4 to the wheel brakes FL, RR, RL and FR (specifically, to the wheel cylinders H) and can increase/maintain/reduce the pressure of the wheel cylinders H. Thus, each control valve unit V includes an inlet valve 1, an outlet valve 2 and a check valve 1*a*.

The inlet valve 1 is a normally-open electromagnetic valve interposed between the wheel brakes FL, RR, RL, FR and the master cylinder MC, that is, in the wheel hydraulic passage B. Since the inlet valve 1 is open normally, it allows the brake pressure to be transmitted from the master cylinder MC to the wheel brakes FL, RR, RL and FR. Also, the inlet valve 1 can be closed by the control unit 20 to block the transmission of the brake hydraulic pressure to the wheel brakes FL, RR, RL and FR when the wheels W are going to be locked.

The outlet valve 2 is a normally-closed electromagnetic valve interposed between the wheel brakes FL, RR, RL, FR and the reservoirs 3, that is, between the wheel hydraulic passage B and the open passage E. Although the outlet valve 2 is normally closed, it can be opened by the control unit 20 to release the brake hydraulic pressure acting on the wheel brakes FL, RR, RL and FR to the respective reservoirs 3 when the wheels W are going to be locked.

The check valve 1*a* is parallel connected to the inlet valve 1. The check valve 1*a* is a one-way valve permitting only the flow of the brake fluid from the wheel brakes FL, RR, RL and FR to the master cylinder MC. On releasing of the depressing power applied to the brake pedal BP, the check valve 1*a* allows the flow of the brake fluid from the wheel brakes FL, RR, RL and FR to the master cylinder MC even when the input valve 1 is closed.

The reservoir 3 is provided in the open passage E to absorb the brake hydraulic pressure released when the outlet valves 2 are opened. Also, a check valve 3*a* is interposed between the reservoir 3 and the pump 4 for allowing only the flow of the brake fluid from the reservoir 3 to the pump 4.

The pump 4 is interposed between the suction hydraulic passage C communicating with the output hydraulic passage A1 and the discharge hydraulic passage D communicating with the wheel hydraulic passage B. The pump 4 pumps up the brake fluid through the suction valve 7 from the master cylinder MC and discharges it to the discharge hydraulic passage D. Therefore, the brake hydraulic pressure can be generated to cause the wheel brakes FL, RR, RL and FR to generate brake power even when a driver does not operate the brake pedal BP.

In this embodiment, the discharge amount of the brake fluid of the pump 4 depends on the rotation number of the motor 9, for example, when the rotation number increases, the discharge amount of the brake fluid by the pump 4 also increases.

An orifice 5 is formed in each of the first and second systems to attenuate the pressure pulsation of the brake fluid discharged from the pump 4.

The regulator valve unit R is normally open to thereby tallow the flow of the brake fluid from the output hydraulic passage A1 to the wheel hydraulic passage B. Also, when the pressure on the wheel cylinder H side is increased by the brake hydraulic pressure generated from the pump 4, the regulator valve unit R blocks the flow of the brake fluid to thereby adjust the pressure on the discharge hydraulic passage D, the wheel hydraulic passage B and the wheel cylinder H side to a set value or less. Thus, each regulator valve unit R includes a switch valve 6 and a check valve 6*a*.

The switch valve 6 is a normally-open linear solenoid valve interposed between the output hydraulic passage A1 communicating with the master cylinder MC and the wheel hydraulic passage B communicating with the wheel brakes FL, RR, RL and FR. Although not shown specifically, the valve body of the switch valve 6 is urged toward the wheel hydraulic passage B and the wheel cylinder H by an electromagnetic force generated due to a current supplied. When the pressure of the wheel hydraulic passage B is equal to or higher by a given value (this value depends on the current supplied) than the pressure of the output hydraulic passage A1, the brake fluid escapes from the wheel hydraulic passage B toward the output hydraulic passage A1, whereby the pressure on the wheel hydraulic passage B side is adjusted to a given pressure.

The check valve 6a is parallel connected to the switch valve 6. The check valve 6a is a one-way valve allowing the flow of the brake fluid from the output hydraulic passage A1 to the wheel hydraulic passage B.

The suction valve 7 is a normally-closed electromagnetic valve provided in the suction hydraulic passage C. The suction valve 7 switches the suction hydraulic passage C between the open and closed states thereof. It is opened by power connected by the control unit 20 when the switch valve 6 is closed to apply the brake hydraulic pressure to the wheel brakes FL, RR, RL and FR.

The pressure sensor 8 detects the brake hydraulic pressure of the output hydraulic passage A1 of the second system.

Next, the control unit 20 will be described.

The control unit 20 control the operations of the respective wheel brakes FL, RR, RL and FR, by controlling the opening/closing operations of the control valve unit V, the switch valve 6 (regulator valve unit R) and the suction valve 7 and the rotation of the motor 9 respectively provided within the hydraulic unit 10 through connection/disconnection of power thereto according to a signal or the like input from the pressure sensor 8 or the like. In this embodiment, when ending control (control to open the suction valve 7 and to drive the motor 9 simultaneously) such as speed reduction control in inter-vehicle distance control, the control unit 20 closes the suction valve 7 after disconnection of power to the motor 9.

That is, the control unit 20, when power to the motor 9 is disconnected, checks whether the motor 9 has actually stopped or not, and on confirming the stop of the motor 9, it closes the suction valve 7. In this embodiment, the control unit 20 executes, among these successive control operations, a control operation to check the motor 9 for its actual stop differently from the conventional manner, while it executes other control operations similarly to the conventional manner.

Figure 3:
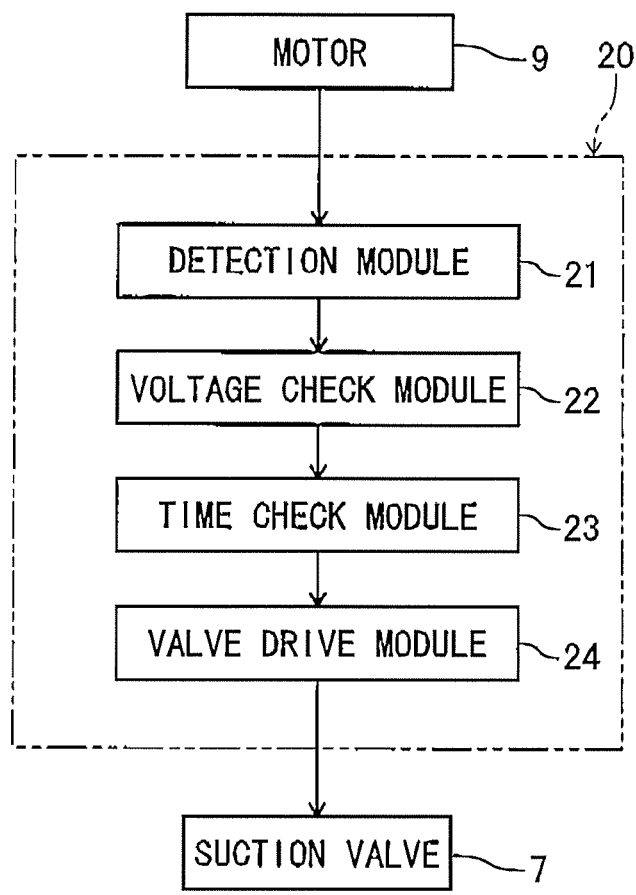
FIG. 3 illustrates a block configuration of a control unit.

As shown in FIG. 3, the control unit 20 includes a detection module 21, a voltage check module 22, a time check module 23 and a valve drive module 24.

The detection module 21 detects a back electromotive voltage generated due to the inertia rotation of the motor 9 after disconnection of power to the motor 9. Specifically, the detection module 21 always (successively or periodically) detects the back electromotive voltage of the motor 9, and outputs the detected back electromotive voltage to the voltage check module 22. To detect the back electromotive voltage, for example, a voltage sensor or a current sensor may be used.

The voltage check module 22 checks whether a motor control signal outputted from the control unit 20 indicates "stop" or not, and for the "stop", checks whether a voltage condition is satisfied or not, that is, whether the back electromotive voltage outputted from the detection module 21 is a given voltage or less or not. And, the voltage check module 22, on confirming the satisfaction of the voltage condition, outputs a signal to that effect to the time check module 23.

The time check module 23 checks whether a time condition is satisfied or not, that is, whether a given time has passed after satisfaction of the voltage condition. Specifically, the time check module 23, on receiving a signal from the voltage check module 22, increments a timer and checks whether the timer corresponds to the given time or more or not. And, the time check module 23, when the time condition is satisfied, outputs a signal to that effect to the valve drive module 24.

The valve drive module 24, on receiving a signal from the time check module 23, disconnects power to the suction valve 7 to close it.

Next, the motor stop check by the control unit 20 (the operations of the detection module 21, the voltage check module 22 and the time check module 23) will be described.

Figure 4:
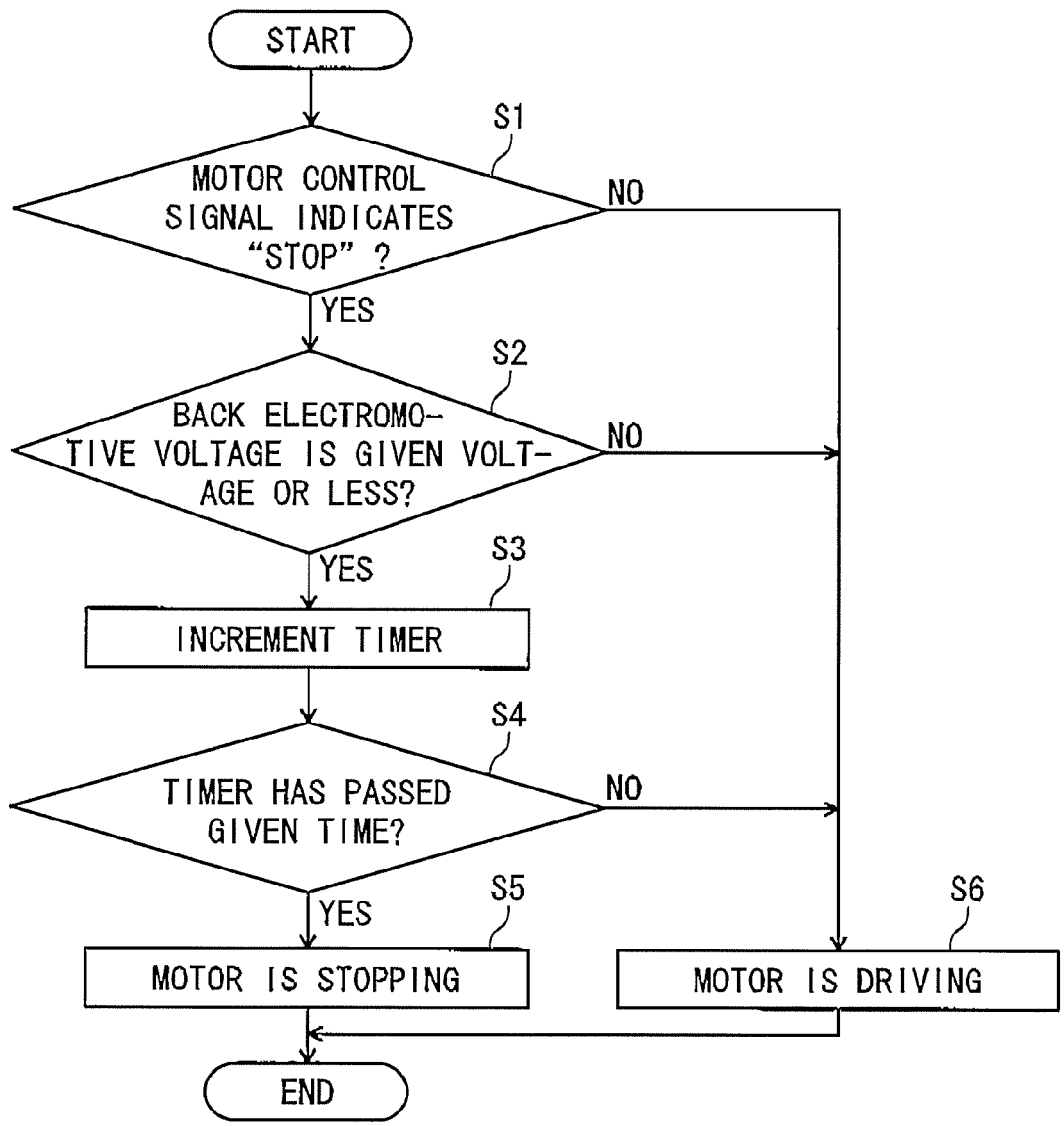
FIG. 4 illustrates an operation of the control unit.

As shown in FIG. 4, the control unit 20 checks whether the motor control signal indicates "stop" or not (S1), and for the "stop" (Yes), checks whether the back electromotive voltage is a given voltage or less or not (S2). When the back electromotive voltage is the given voltage or less in Step S2 (Yes), the control unit 20 increments a timer (S3).

After Step S3, the control unit 20 checks whether the timer has passed a given time or not (S4). When the timer has passed the given time in Step S4 (Yes), the control unit 20 determines that the motor 9 is stopping (S5), ending this check control.

Also, when the motor control signal does not indicate "stop" in Step S1 (No), when the back electromotive voltage is not the given voltage or less in Step S2 (No), and when the timer has not passed the given time in Step 4 (No), the control unit 20 determines that the motor 9 is driving (S6), ending this check control. In this embodiment, the check control is started simultaneously with the drive start of the motor 9 and is executed repeatedly until the stop of the motor 9 is confirmed. When this check control confirms that the motor is stopping, the control unit 20 disconnects power to the suction valve 7, and thereafter, resets the timer.

Next, the speed reduction control in the inter-vehicle distance control by the control unit 20 will be described.

Figure 5:
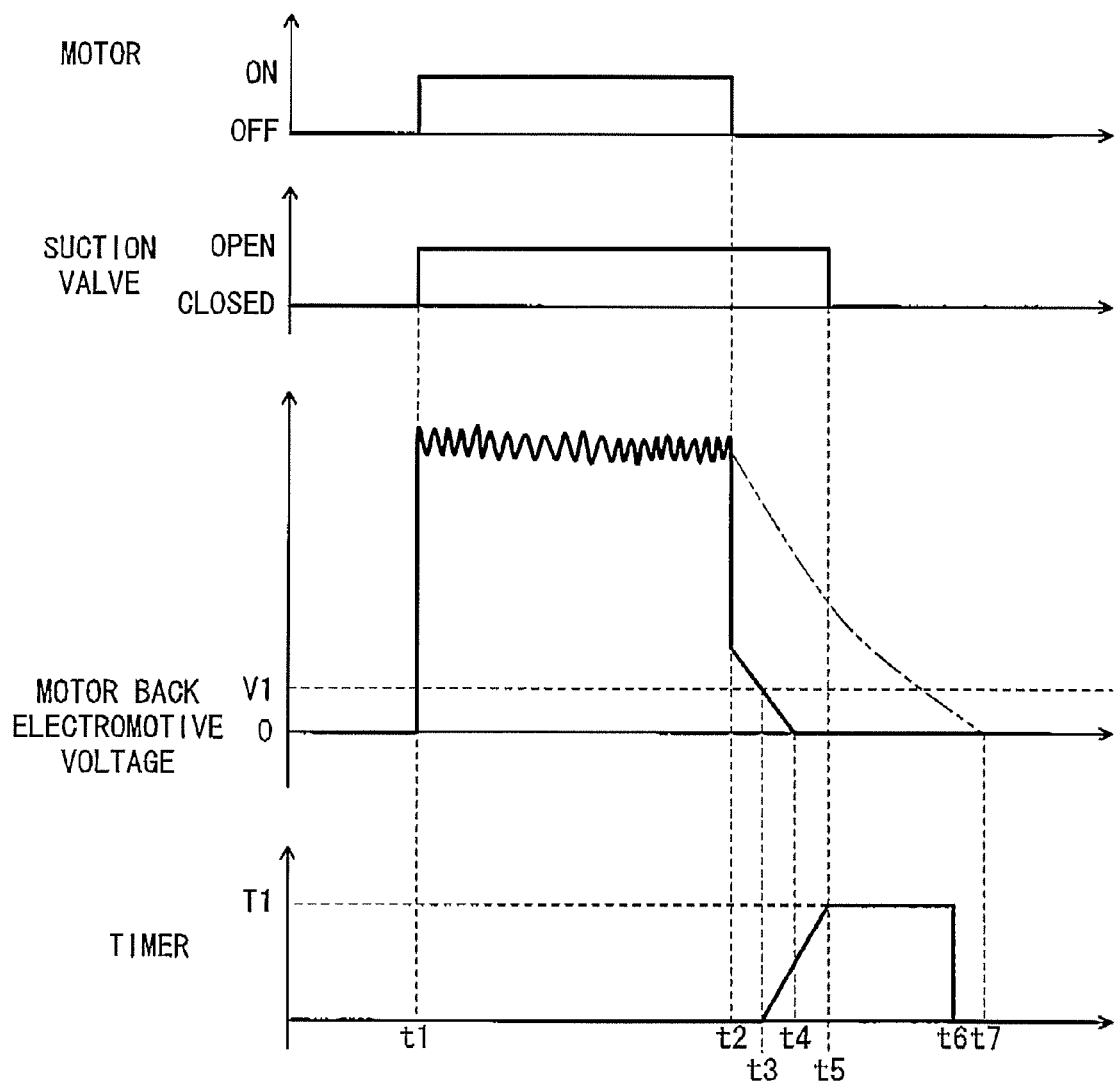
FIG. 5 illustrates an operation from the start to the stop of a motor.

As shown in FIG. 5, in the speed reduction control, first, the control unit 20 opens the suction valve 7, and starts the connection of power to the motor 9 (time t1). Then, to end the speed reduction control, the control unit 20 disconnects power to the motor 9 (time t2). Here, the motor 9 does not stop immediately but inertia rotates (times t2-t4).

Thus, the back electromotive voltage of the motor 9 does not become zero immediately but reduces gradually. And, when the back electromotive voltage reaches a given voltage (V1), the increment of the timer is started (time t3).

And, when the timer reaches a given time (T1), the control unit 20 disconnects power to the suction valve 7 to close it (time t5). Then, the control unit 20 resets the timer at a proper timing (time t6).

In this embodiment, since the back electromotive voltage due to the inertia rotation of the motor 9 is detected by the detection module 21, the actual rotation of the motor 9 can be confirmed during the time until the voltage condition is satisfied (during the times t2-t3). Therefore, it is not necessary to set such time by taking into account the worst case, unlike the conventional technology. Also, the given time (T1) to be set as the time condition can also be shortened by omitting the consideration of the time (during the time 2-time 3) necessary until the voltage condition is satisfied.

That is, conventionally, the timer starts its count at the time t2. Thus, the time necessary for ensuring the stop of the motor 9 tends to become longer than necessary as a result of taking into account various factors. For example, the longest time until the stop of the motor 9 may be assumed. Further, the gentlest inclination of the reduction of the back electromotive voltage starts from the time t2 due to the motor inertia rotation may also be assumed. In this case, as shown by two-dot chained lines in FIG. 2, the time capable of ensuring the motor stop requires the time t7 which is later than the stop time t5 in the case of this embodiment.

In this embodiment, in the former half of the operation to check the stop of the motor 9, the actual rotation of the motor 9 is confirmed with reference to the back electromotive voltage. Thus, the influence of the inclination of the back electromotive voltage on the time condition in the latter half of the checking operation can be reduced, thereby reducing the time necessary to check the stop of the motor 9. This can greatly shorten the time necessary for connecting power to the suction valve 7, thereby reducing the heat generation of the suction valve 7 and the control unit 20.

In this embodiment, the check for the stop of the motor 9 is made according to not only the time condition but also the voltage condition. Thus, for example, as compared with the case of checking the motor stop only according to the voltage condition, the stop of the motor 9 can be determined after it stops surely even when the zero point position of the back electromotive voltage of the motor 9 is offset to the minus side due to the ground floating, A/D conversion errors and the like.

That is, by previously setting the given voltage and the given time with the offset of the zero point position of the back electromotive voltage of the motor 9 taken into account, even when the zero position is offset, the stop check can be made surely. Specifically, as shown in FIG. 6, the given voltage may be set for the possible maximum offset value V1 of the zero point position of the back electromotive voltage.

Figure 6:
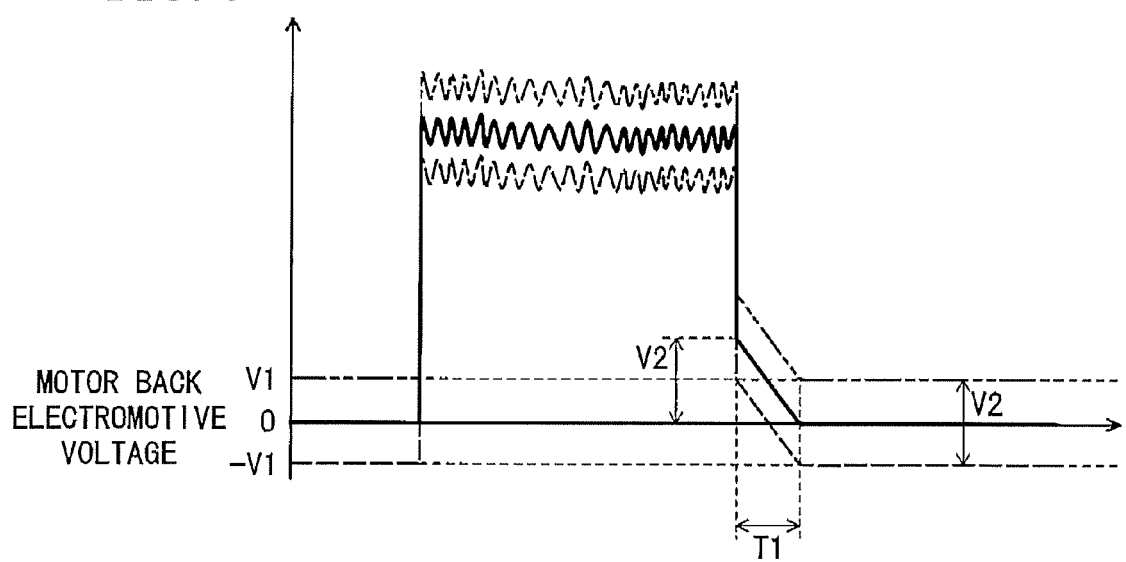
FIG. 6 illustrates a method for setting a given voltage and a given time.

In FIG. 6, the possible maximum offset value (V1) of the zero point position of the back electromotive voltage is shown by a two-dot chained line, whereas the possible minimum offset value (−V1) is shown by a broken line. The maximum value (V1) and the minimum value (−V1) may be confirmed, for example, by experiments or by simulation.

The given time may be set for the time (T1) necessary for the inertia rotating motor 9 to stop in order that, as the back electromotive voltage, a voltage (2V) corresponding to a difference between the given voltage and the possible minimum offset value (−V1) of the zero point position of the back electromotive voltage can be generated. The time (T1) may be obtained, for example, by experiments or by simulation.

Figure 7:
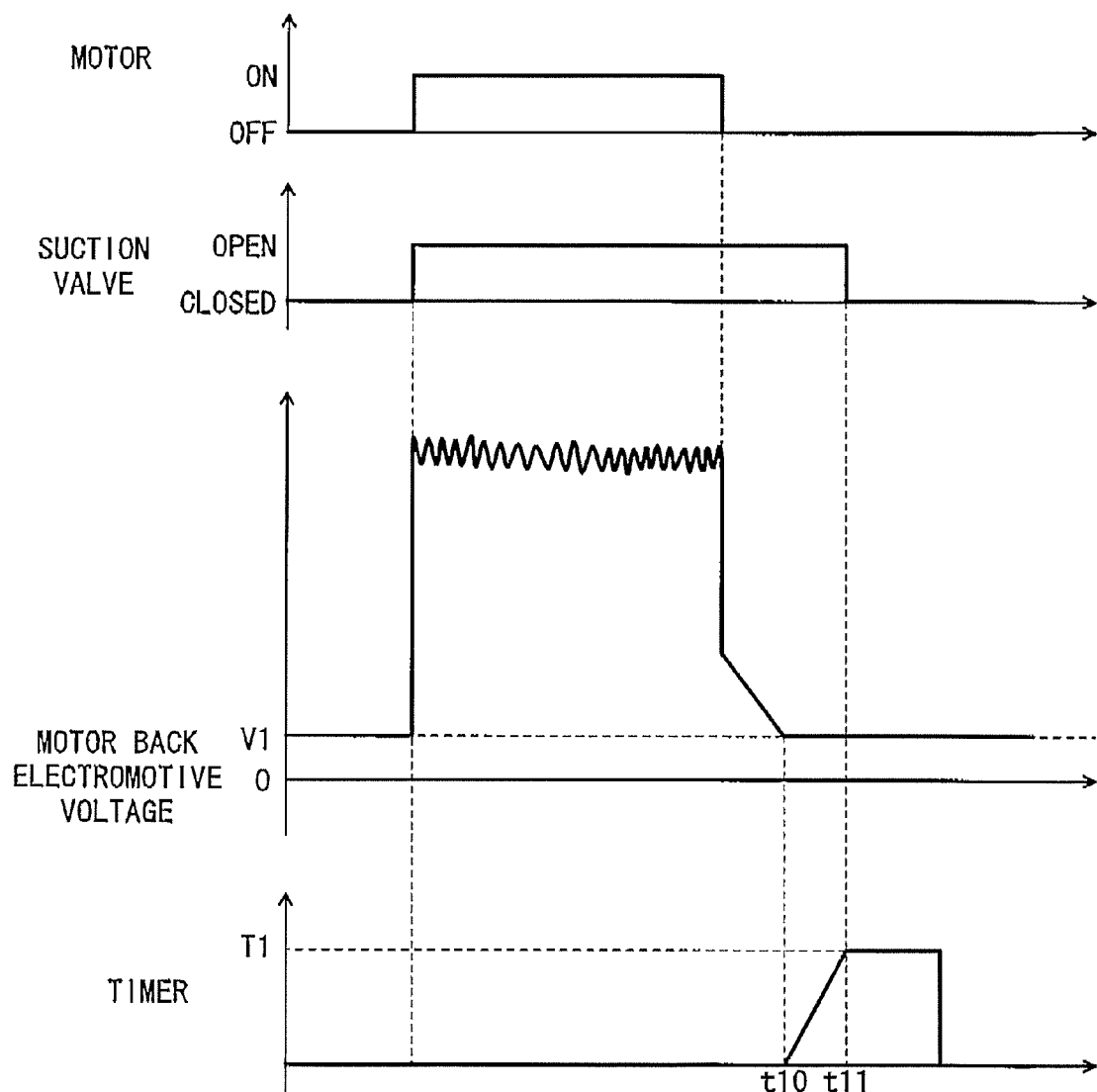
FIG. 7 illustrates the operation when a zero point position is offset to the plus side.

By setting the given voltage for the maximum value V1 in the above-mentioned manner, as shown in FIG. 7, even when the zero point position of the back electromotive voltage detected by the detection module 21 is offset to the plus side (maximum value V1 side), the detected back electromotive voltage can reach the given voltage surely (time t10), and then, the suction valve 7 can be closed surely (time t11) after passage of the given time (T1).

Figure 8:
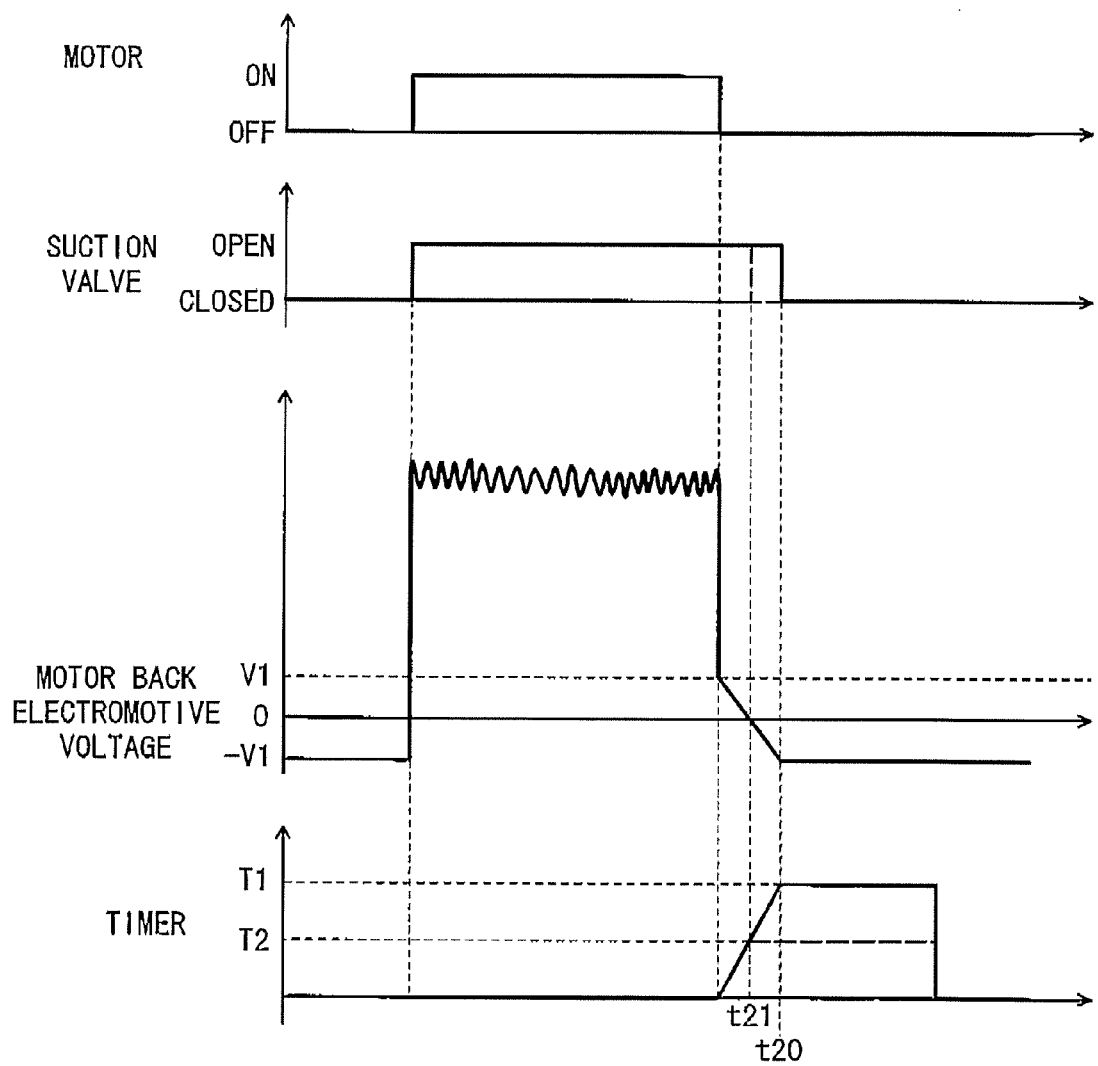
FIG. 8 illustrates the operation when the zero point position is offset to the minus side.

Also, by setting the given time in the above-mentioned manner, as shown in FIG. 8, even when the zero point position is offset to the minimum value (−V1), after the motor 9 stops surely (after the back electromotive voltage reaches the minimum value −V1: time t20), the suction valve 7 can be closed (time t20). That is, for example, when the given time is set for the time T2 shorter than the above time T1, according to the determination that the motor 9 has stopped at the time t21 earlier than the time t20, the suction valve 7 is closed (see a broken line), whereby a genitive pressure may be generated by the inertia rotation of the motor 9 during the times t21 t20. According to the embodiment, generation of such negative pressure can be surely prevented.

The invention is not limited to the above embodiment but, as illustrated in the following manner, can be variously modified.

Figure 9:
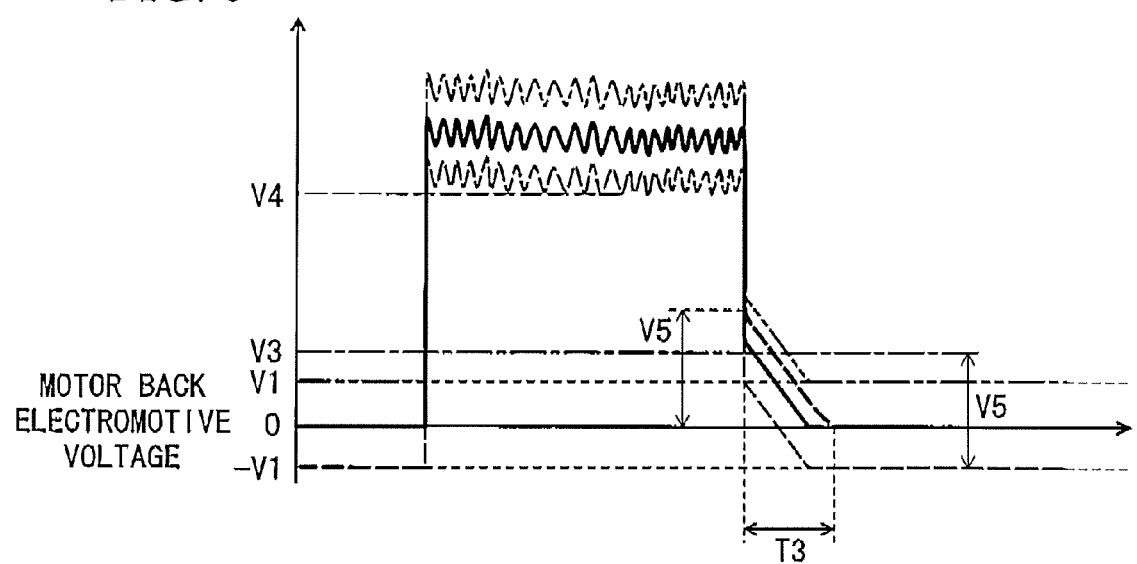
FIG. 9 illustrates another method for setting a given voltage and a given time.

In the above embodiment, the given voltage is set for the possible maximum offset value (V1) of the zero point position of the back electromotive voltage. However, the invention is not limited to this but the given voltage may also be a value larger than the maximum value (V1). For example, as shown in FIG. 9, the given voltage may also be set for a value V3 slightly larger than the possible maximum offset value (V1) of the zero point position of the back electromotive voltage. The value V3 can be set for, for example, a value larger than the maximum value (V1) and smaller than the minimum value V4 of the back electromotive voltage in the rotation of the motor 9 due to power connected thereto.

Even in this case, when the zero point position of the back electromotive voltage is offset to the plus side (see a two-dot chained line), since the given voltage is set for the value V3 equal to or larger than the possible maximum offset value (V1), the back electromotive voltage can reach the given voltage (V3) surely and then, after the passage of the given time, the suction valve 7 can be closed surely.

Also, in this case, the given time may be set for the time (T3) necessary for the inertia rotating motor 9 to stop while generating, as the back electromotive voltage, a voltage (V5) corresponding to a difference between the given voltage (V3) and the possible minimum offset value (−V1) of the zero point position of the back electromotive voltage. By setting the given time in this manner, similarly to the above embodiment, even when the zero point position is offset to the minimum value (−V1) (see a broken line), during the time from when the back electromotive voltage has reached the given voltage (V3) to when it has reduced to the minimum value (−V1), the suction valve 7 can be left open, thereby preventing generation of a negative pressure surely.

When the given voltage is set for the maximum value (V1) as in the above embodiment, as compared with a case where the given voltage is set for the value (V3) larger than the maximum value (V1), the given time under the time condition can be set for the time (T1) shorter than the time (T3). In view of this, the above embodiment may be preferred.

In the above embodiment, the magnitude (absolute values) of the possible maximum and minimum offset values of the zero point position of the back electromotive voltage is the same value (V1). However, the invention is not limited to this but the maximum and minimum values may be different values.

In the above embodiment, the back electromotive voltage of the motor 9 is always detected by the detection module 21. However, the invention is not limited to this. For example, the detection of the back electromotive voltage may be started when the motor control signal indicates "stop". In this case, the voltage check module may check whether the detected back electromotive voltage is the given voltage or less or not after detection of the back electromotive voltage by the detection module is started.

The invention claimed is:

1. A vehicle brake hydraulic control apparatus, comprising:
   a suction valve configured to open upon connection of power thereto;
   a pump configured to draw up brake fluid from a hydraulic source through the suction valve;
   a motor configured to drive the pump upon connection of power thereto; and
   a control unit configured to control the opening/closing of the suction valve and the drive of the motor through connection/disconnection of power thereto,
   wherein the control unit includes:
      a detection module configured to detect a back electromotive voltage generated due to an inertia rotation of the motor after disconnection of power to the motor;

a voltage check module configured to check whether the back electromotive voltage is equal to or less than a given voltage; and a time check module configured to check whether a given time has passed after the voltage check module has detected that the back electromotive voltage is equal to or less than the given voltage, whereby the control unit closes the suction valve when the time check module has detected that the given time has passed after the voltage check module has detected that the back electromotive voltage is equal to or less than the given voltage.

2. The apparatus of claim 1,
wherein the given voltage is set for a value equal to or larger than a possible maximum offset value of a zero point position of the back electromotive voltage.

3. The apparatus of claim 2,
wherein the given time is set for a time necessary for the motor to stop the inertia rotation while generating the back electromotive voltage corresponding to a difference between the given voltage and a possible minimum offset value of the zero point position of the back electromotive voltage.

4. The apparatus of claim 2,
wherein the given voltage is set for the possible maximum offset value.

5. The apparatus of claim 1,
wherein the control unit control operations of respective wheel brakes by controlling opening/closing operations of a control valve unit, a switch valve and the suction valve and rotation of the motor.

6. The apparatus of claim 5,
wherein when ending control to open the suction valve and to drive the motor simultaneously the control unit closes the suction valve after disconnection of power to the motor when the motor has been determined to be stopped.

7. The apparatus of claim 6,
wherein when the power to the motor is disconnected, the control unit checks whether the motor has actually stopped or not, and on confirming the stop of the motor based on the given time, the control unit closes the suction valve.

8. The apparatus of claim 1,
wherein the detection module successively or periodically detects the back electromotive voltage of the motor, and outputs the detected back electromotive voltage to the voltage check module.

9. The apparatus of claim 8,
wherein the detection module comprises a voltage sensor or a current sensor to detect the back electromotive voltage.

10. The apparatus of claim 8,
wherein the voltage check module, on confirming satisfaction of the voltage condition, outputs a signal to that effect to the time check module.

11. The apparatus of claim 10,
wherein the time check module, on receiving the signal from the voltage check module, increments a timer and checks whether the timer corresponds to the given time.

12. The apparatus of claim 11,
wherein the control unit further comprises a valve drive module, which, on receiving a signal from the time check module, disconnects power to the suction valve to close the suction valve.

13. The apparatus of claim 1,
wherein actual rotation of the motor is confirmed during the time until the voltage condition is satisfied.

14. The apparatus of claim 1,
wherein a check for stop of the motor is made according to the time condition and voltage condition.

15. The apparatus of claim 14,
wherein the stop of the motor is determined after it stops even when a zero point position of the back electromotive voltage of the motor is offset to a minus side due to ground floating and A/D conversion errors.

16. The apparatus of claim 14,
wherein the given time is set for time (T1) necessary for the inertia rotation of the motor to stop in order that, as the back electromotive voltage, a voltage (2V) corresponding to a difference between the given voltage and a possible minimum offset value (−V1) of a zero point position of the back electromotive voltage is generated.

17. The apparatus of claim 14,
wherein the given voltage is set for a value (V3) larger than a possible maximum offset value (V1) of a zero point position of the back electromotive voltage.

* * * * *